UNITED STATES PATENT OFFICE.

WALTER MILLS, OF LONDON, ENGLAND.

METHOD OF MANUFACTURING WHITE LEAD.

No. 881,016.     Specification of Letters Patent.     Patented March 3, 1908.

Application filed February 12, 1907. Serial No. 357,066.

*To all whom it may concern:*

Be it known that I, WALTER MILLS, a subject of the King of England, residing at London, England, have invented certain new and useful Improvements in Methods of Manufacturing White Lead, of which the following is a specification.

This invention relates to a method of obtaining a pigment from ores of lead.

According to the present method of manufacturing the well known white lead of commerce (basic carbonate of lead), lead in a metallic form is first prepared from the ore, and then the metal is either converted into sheets or burned to litharge.

The object of this invention is to dispense with the metallurgy of lead, and to obtain from the ores a pigment in many respects superior to the basic carbonate of lead.

Ores of lead may be divided into two classes, viz., that in which sulfur is the predominating element in combination with the metal, and that in which oxygen is the chief element so compounded. Galena is the type of the former class, while the latter is represented in nature by such ores as cerusite, leadhillite, pyromorphite. All such ores are available for treatment by this process.

In the first stage of the process I grind or crush the ore to a fine powder. In the case of a sulfur ore, such as galena, I then bring the ore in contact with gaseous hydric chlorid, which decomposes the ore, with formation of plumbic chlorid and hydric sulfid, in accordance with the equation,

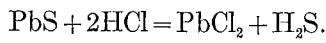

$$PbS + 2HCl = PbCl_2 + H_2S.$$

This reaction takes place at the ordinary temperature, but may be accelerated by heat. I find that a temperature of about 80–100 C. gives very satisfactory results on a commercial scale. During the reaction the ore must be well stirred or agitated so as to expose its particles to the hydric chlorid gas, which develops a considerable amount of heat by its action on the ground galena. When this treatment of the ore is complete the transformed ore is removed from the apparatus in which it is contained, and subjected to the process hereinafter described. The hydric sulfid given off is burned in air, and the products of its combustion are converted into sulfuric acid in the usual way.

In the case of oxygen ores of lead, such as cerusite, I may subject them to the same treatment as galena, but I prefer to employ an aqueous solution of hydric chlorid in their case. I find that such a solution, containing about ten per cent. of the gas is well adapted for my purpose; the reaction between the solution and the ground ore is accelerated by a little heat, but decomposition takes place rapidly in the cold, with expulsion of carbonic anhydrid when cerusite is used. The lead salt formed is the same as in the case of galena, viz., plumbic chlorid.

After treating the ore by either of the methods aforesaid I lixiviate it with hot water, in order to dissolve out the plumbic chlorid. I find that a saturated aqueous solution of plumbic chlorid boils at about 100 C. at the ordinary barometric pressure, but stronger solutions may be obtained by digesting the treated ore at a higher temperature under pressure; such solutions deposit almost all the plumbic chlorid when cold. Common salt may be added to the treated ore before lixiviation, in order to keep in solution in the extract when cold other metallic chlorids which may be present therein. Having thus obtained plumbic chlorid, I next treat that salt with sulfuric acid, which readily decomposes it in the cold, liberating hydric chlorid. When galena is being treated it is desirable to use a somewhat strong acid, and to heat the mixture of acid and chlorid in a steam-jacketed pan. When oxygen ores are dealt with, much weaker acid may be employed. A satisfactory method of treating the chlorid produced from such ores consists in adding water to the chlorid, and then stirring in strong acid; in this way heat is generated which facilitates the conversion of the chlorid into sulfate. The sulfuric acid may, as will be understood, be of any suitable strength. The object of using a strong acid is to get more fluid into the pan. In the case of oxygen ores there is a considerable amount of effervescence if a strong acid be used, and less if the acid be weak.

In practice I find that crystals of plumbic sulfate prepared as aforesaid, or by any process of precipitation, are not absolutely anhydrous, but contain small and varying proportions of combined water, which renders them easy to convert into a pigment. I prefer, therefore, to employ such sulfates, although I may also use, but with less advantage, the sulfate of lead which is prepared by volatilizing galena and oxidizing the fume.

By whatever method it is prepared, sulfate of lead is a highly crystalline substance, which does not unite with oil and is therefore unsuited for paint, but when treated by the process hereinafter described, it ceases to be crystalline, and unites freely with oil, forming a paint of excellent body and brilliant color, which does not alter in air as readily as ordinary white lead (basic carbonate).

I place the sulfate on a filter bed and wash it with water in order to remove from it any foreign substances which it may contain. The washed sulfate, in a wet condition, is then put into a vessel provided with an apparatus by which it may be continuously stirred during the next operation. When placed in the receptacle water is added to it, and then gaseous or aqueous ammonia in the proportions hereinafter indicated is introduced. I find that the amount of water added to the sulfate before introducing the ammonia has an important bearing on the constitution of the ultimate product. It is known that, when treated with strong caustic ammonia, a basic sulfate of lead represented by the formula $Pb_2SO_5$ is produced, but such a salt is crystalline and useless as a pigment. I find, however, that by properly regulating the amount of water added to the sulfate of lead or to the ammonia as the case may be, I obtain a product which, when dried at about 80 C. contains combined water, is not crystalline but amorphous, and admirably adapted for use in making paint. Thus I find in treating about 14 kilograms of sulfate of lead if I add to it its own weight of water, and then introduce into the agitated mixture aqueous ammonia of a specific gravity of 0.88, I obtain a product which, when washed with water and dried at about 80 C., has the following percentage composition:—

Oxid of lead (PbO) _____ 80.63
Sulfuric anhydrid ($SO_3$) _____ 15.65
Combined water _____ 3.72

This substance corresponds approximately with the formula $PbSO_4.Pb(HO)_2$.

If twice the weight of water is employed in like manner, the product contains 2.38 per cent. of combined water: if thrice the amount of water is used, the product contains only 0.18 per cent. of water of combination, and is almost too crystalline for use as a pigment. The limit of practicability would seem to be reached when a weight of water thrice that of the sulfate is added to it, and the aqueous ammonia employed contains 25 per cent. of the gas. A somewhat similar product is obtained when normal sulfate of lead is agitated with aqueous ammonia containing 1.75 per cent. of the gas.

In practice I find that the use of as little necessary water, and of as strong aqueous ammonia as practicable, produces the best and most uniform results. The presence of the proper proportion of water is essential and I prefer to add it to the sulfate of lead rather than to the aqueous ammonia.

The reaction which takes place between the sulfate of lead, ammonia, and water is represented by the following equation:— This also indicates the theoretical proportions of the sulfate of lead and ammonia, although, in working on a commercial scale, it is advisable to use a slight excess of ammonia:—

$$2PbSO_4 + 2NH_3 + 2H_2O = PbSO_4.Pb(HO)_2 + (NH_4)_2SO_4.$$

The reaction indicated by this equation is usually complete in about an hour; the transformed sulfate is then washed with water in order to extract the ammonia sulfate which is produced. Afterwards the transformed sulfate of lead is dried; it dries in air at the ordinary temperature, and when so dried loses 0.35 per cent. at 100 C.; a temperature of about 80 C. would seem to be well adapted for drying purposes.

Ammonia, either as gas or in aqueous solution, may be introduced into the mixture of sulfate of lead and water either at the top or bottom of the mass; when a stirring apparatus is employed, it is convenient to use a hollow stirrer, and to allow the ammonia to enter the mixture, during stirring, through perforations in the arms of the stirrer.

I use the words "strong" and "weak" respectively as applied hereinbefore to sulfuric acid. By a strong acid I mean anything from a specific gravity of 1.84 down to 1.6; below the latter the acid is considered to be weak.

What I claim is—

1. A process which comprises the following steps: first, bringing lead-containing ore into contact with hydric-chlorid gas to decompose the ore and form plumbic chlorid and hydric sulfid; second, leaching out the plumbic-chlorid by a solvent; and, third, treating the plumbic-chlorid with sulfuric acid to obtain plumbic-sulfate.

2. The method of manufacturing a hydrated basic pigment from sulfate of lead, which consists in treating the normal sulfate with aqueous ammonia containing not less than 1.75 per cent. of gas.

3. A process which comprises the following steps: first, bringing lead-containing ore into contact with hydric chlorid gas to decompose the ore and form plumbic chlorid and hydric sulfid; second, leaching out the plumbic-chlorid by a solvent; third, treating the plumbic-chlorid with sulfuric acid to obtain plumbic-sulfate; fourth, adding water to said sulfate; and, fifth, adding ammonia to the sulfate water.

4. The described method of manufacturing a hydrated basic pigment from sulfate of lead, which consists in mixing with the sulfate about its own weight of water, more or less according to the quantity of ammonia present in the aqueous solution of ammonia used, but so that not more than three times the weight of the sulfate with respect to water is employed, and then adding to the said mixture ammoniacal fluid containing gaseous ammonia.

In testimony whereof I have hereunto set my hand in presence of two subscribing witnesses.

WALTER MILLS.

Witnesses:
   H. D. JAMESON,
   A. NUTTING.